(12) United States Patent
Marien et al.

(10) Patent No.: US 8,794,389 B2
(45) Date of Patent: Aug. 5, 2014

(54) INTERFACE BETWEEN FIRE PANEL AND ELEVATOR CONTROLLER

(75) Inventors: Bruce W. Marien, Fitchburg, MA (US); Jeffrey R. Brooks, Ashburnham, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 576 days.

(21) Appl. No.: 13/173,049

(22) Filed: Jun. 30, 2011

(65) Prior Publication Data

US 2013/0001022 A1    Jan. 3, 2013

(51) Int. Cl.
*B66B 1/34*    (2006.01)

(52) U.S. Cl.
USPC .......................................... 187/391; 340/506

(58) Field of Classification Search
USPC .......... 187/247, 391–393, 413, 414; 340/506, 340/507, 509, 510, 514–516, 531
See application file for complete search history.

(56) References Cited

U.S. PATENT DOCUMENTS

| | | | | |
|---|---|---|---|---|
| 3,587,095 A | * | 6/1971 | Earling | 340/509 |
| 3,651,330 A | * | 3/1972 | Hayes | 307/64 |
| 4,002,973 A | | 1/1977 | Wiesendanger et al. | |
| 4,023,139 A | * | 5/1977 | Samburg | 340/506 |
| 4,459,582 A | * | 7/1984 | Sheahan et al. | 340/539.16 |
| 4,497,391 A | | 2/1985 | Mendelsohn et al. | |
| 5,721,403 A | | 2/1998 | Hoppie et al. | |
| 6,000,505 A | | 12/1999 | Allen | |
| 7,401,685 B2 | | 7/2008 | Roschier et al. | |
| 7,575,102 B2 | | 8/2009 | Matsuoka | |
| 2011/0193682 A1 | * | 8/2011 | SeBasco | 340/6.1 |

OTHER PUBLICATIONS

International Search Report and Written Opinion received for PCT Patent Application No. PCT/US12/44379, mailed on Oct. 4, 2012, 8 pgs.

* cited by examiner

*Primary Examiner* — Anthony Salata
(74) *Attorney, Agent, or Firm* — Kacvinsky Daisak Bluni PLLC

(57) ABSTRACT

A system and method for logically disconnecting fire alarm equipment from elevator control equipment to enable independent testing of each equipment set. The system and method may include an interface having a fire alarm equipment side and an elevator control side which are interconnected by a plurality of relays. A plurality of action relays may be associated with specific functions of the elevator controller. A plurality of bypass relays are interposed between the action relays and the elevator controller so that when a "bypass" operation is initiated, the bypass relays prevent signals from the action relays from reaching the elevator controller. As such, the action relays can be tested without impacting ongoing elevator operations. In addition, the logical disconnection arrangement ensures proper functioning of the system once testing is completed.

21 Claims, 8 Drawing Sheets

INTERFACE BETWEEN FIRE PANEL AND ELEVATOR CONTROLLER

FIELD OF THE DISCLOSURE

The present disclosure relates generally to interfaces between fire panel equipment and elevator controllers, and more particularly to an improved interface between fire panel equipment and an elevator controller that facilitates safe independent testing of the fire equipment and elevator controller.

BACKGROUND OF THE DISCLOSURE

A typical interface from a fire alarm panel to an elevator controller may include multiple relays or relay IAMs (individually addressable modules) for initiating a variety of elevator control functions. These relays are separate devices that are usually bundled together at a location next to the elevator controller, typically within about three feet, as required by typical fire codes.

Problems can arise from current arrangements when personnel arrive to perform testing of the fire alarm equipment or the elevator controller. During such servicing it may be necessary to disconnect the fire alarm equipment from the elevator controller to ensure testing of one portion of the system does not adversely affect other portions. Currently, this is accomplished by physically disconnecting the fire alarm equipment wiring from the elevator controller wiring. As will be appreciated, however, once testing is completed it is possible for the service personnel to forget to reconnect the wiring, or to reconnect the wiring improperly. If this occurs on the elevator equipment side of the relays, no indication or notification of such a condition is provided to building personnel to alert them that an abnormal condition exists.

As such, if a subsequent condition occurs that requires elevator operation (e.g., a fire alarm condition that in normal cases would result in a recall of the elevator car to a predetermined floor), that operation may not occur, or it may occur in a manner that is undesired. In one extreme example, it could result in people in an elevator being delivered to the floor of a fire instead of away from it.

With current systems, testing of fire alarm panel and elevator control systems requires that fire panel and elevator control service personnel be present to ensure that all system functionalities are reset properly once testing is complete. In addition, while current fire alarm panel programming can provide a method for "bypassing" the operation for elevator control, such current bypass techniques prevent testing of the elevator control relays, which as will be appreciated, is less than desirable.

Thus, there is a need for an improved interface between fire alarm equipment and elevator controller that enables quick and easy logical disconnection of the two systems, and that also ensures proper system reconnection and operation subsequent to the completion of testing of either system. Such an interface should provide automatic alerts to enable building personnel to monitor the status of the logical disconnection. The interface also may provide a historical log of testing, including an indication of what entity initiated the disconnection (e.g., fire alarm personnel or elevator service personnel). In addition, the interface may also provide a log of other system status and/or operational information, as desired.

SUMMARY

An interface is disclosed for connecting a fire alarm panel to an elevator controller. The interface includes an action relay and a bypass relay. The action relay is configured to transmit a signal to the elevator controller in response to a signal from the fire alarm panel. The bypass relay is configured for selective electrical coupling between the action relay and the elevator controller. The interface has a normal operating configuration and a bypass configuration. In the normal operating condition the action relay are capable of transmitting a signal to the elevator controller in response to a signal from the fire alarm panel. In the bypass configuration the bypass relay is electrically coupled between the action relay and the elevator controller such that signals from the action relay are transmitted to the bypass relay and are not transmitted to the elevator controller.

A method for isolating a fire alarm panel from an elevator control system is disclosed. The method comprises, at an interface, electrically coupling a plurality of bypass relays between a plurality of action relays and an elevator controller; initiating a test sequence for the plurality of action relays is initiated; performing testing of each of the plurality of action relays, the testing comprising activating each of the plurality of action relays; wherein signals transmitted by each of the plurality of action relays are diverted to respective ones of the plurality of bypass relays so that the signals are not transmitted to the elevator controller.

A system is disclosed for connecting a fire alarm panel to an elevator controller. The system includes means for electrically coupling a plurality of bypass relays between a plurality of action relays and an elevator controller, means for initiating a test sequence for the plurality of action relays is initiated, and means for performing testing of each of the plurality of action relays, the testing comprising activating each of the plurality of action relays. Signals transmitted by each of the plurality of action relays are diverted to respective ones of the plurality of bypass relays so that the signals are not transmitted to the elevator controller. An interface is disclosed for connecting a fire alarm panel to an elevator controller.

An interface is disclosed for selectively connecting a fire alarm panel to an elevator controller. An interface is coupled to a fire alarm panel and an elevator controller, the interface having a bypass switch. The bypass switch can be configured for selectively electrically decoupling the fire alarm panel and the elevator controller. The interface has a normal operating configuration and a bypass configuration. In the normal operating condition the elevator controller is coupled to the fire alarm panel. In the bypass configuration the fire alarm panel is electrically decoupled from elevator controller.

BRIEF DESCRIPTION OF THE DRAWINGS

By way of example, a specific embodiment of the disclosed device will now be described, with reference to the accompanying drawings, in which.

DETAILED DESCRIPTION

Figure 1:
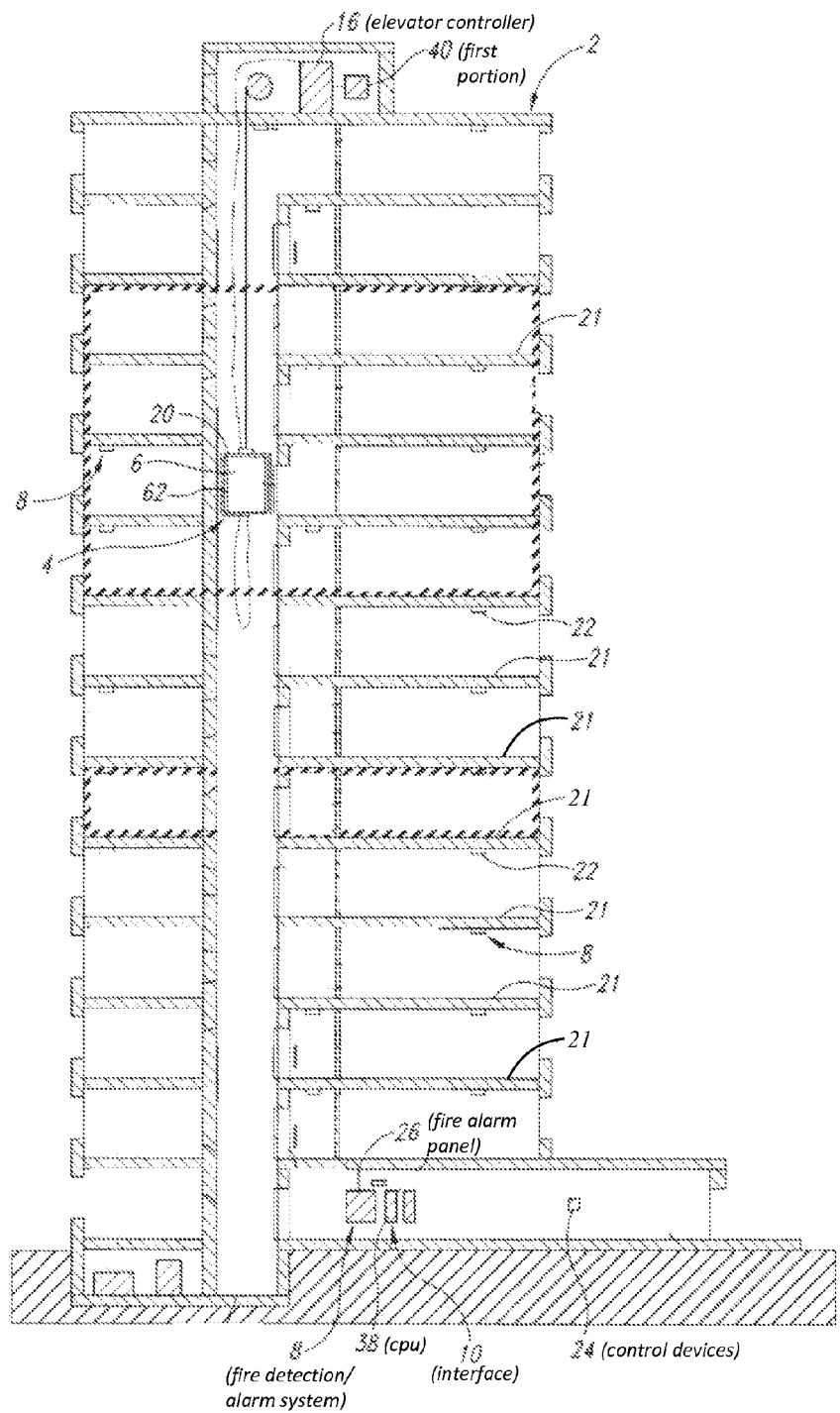
FIG. 1 is a sectional view of an exemplary elevator system.

Referring to FIG. 1, a multiple level building 2 includes a building egress system 4 comprising a vertical transportation system, such as an elevator system 6, connected to a smoke and fire detection/alarm system 8 by an interface 10. The elevator system 6, the detection/alarm system 8, and the interface 10 may be interconnected to enable operation of the system for normal, non-emergency conditions, and also to allow the elevator system to be used by the building occupants for egress from the building 2 during a fire or other emergency situation.

The elevator system 6 includes at least one elevator car 20 controlled by an elevator controller 16 for moving the elevator car to selected floors 21 of the building 2. The elevator controller 16, includes an interconnected relay network or a central processing unit (CPU) programmed to control operation and movement of the elevator car 20.

The smoke and fire detection/alarm system 8 can include a plurality of smoke/fire detectors 22 connected to a fire alarm panel 26. The fire alarm panel 26 may have an interconnected relay network or CPU programmed to identify signals from individual smoke/fire detectors 22 located throughout the building 2. The CPU may also be programmed to send further distinctive signals to control devices 24 in the building 2 to operate specific building functions, such as automatically closing fire doors.

The interface 10 is coupled to the fire alarm panel 26 and the elevator controller 16. The interface 10 includes an interconnected relay network or a central processing unit (CPU) 38 programmed to locate and identify signals from the fire alarm panel 26 or other individual interconnection system signal initiating devices. The CPU 38 is also programmed to send signals to the elevator controller 16, or other interconnection system signal responsive devices, to operate specific interconnection functions, such as selectively moving the elevator car 20 in response to the location of smoke and fire during a building fire.

Figure 2:
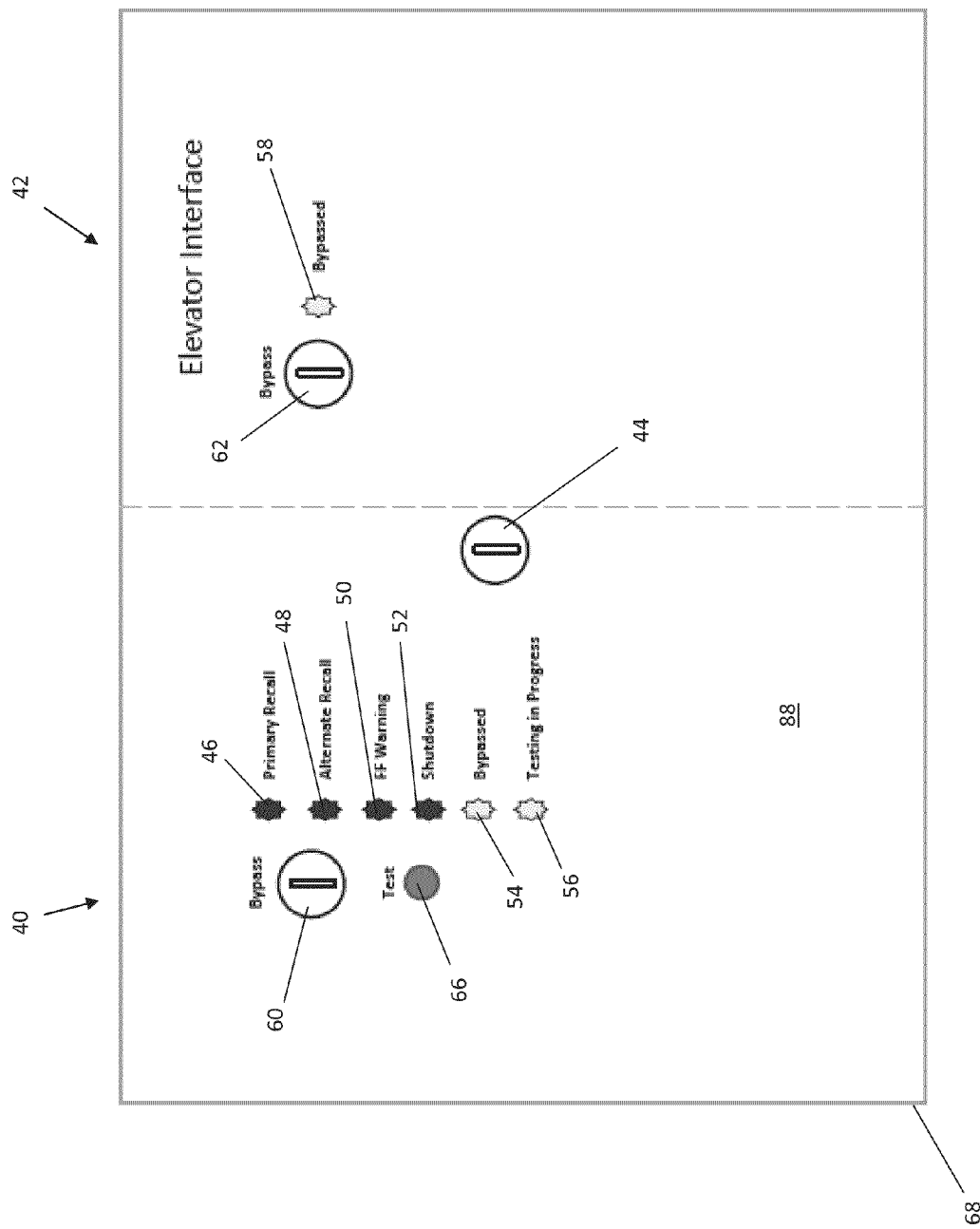
FIG. 2 is an illustration of a front face panel of an interface for use with the system of FIG. 1.

As shown in FIG. 2, the interface 10 may consist of two portions or sides, a first of which is associated with the fire alarm panel 26 and the other of which is associated with the elevator controller 16. In the illustrated embodiment, the first portion 40 is associated with the fire alarm equipment, and the second portion 42 is associated with the elevator controller 16.

As arranged, fire alarm equipment service personnel can access the first portion 40 of the interface 10 and "logically" disconnect the fire alarm panel 26 from the elevator controller 16 to perform testing of the fire alarm panel without affecting the elevator controller 16. In one exemplary embodiment, this logical disconnect can be initiated using a keyswitch operable via keyway 60. Once the two portions 40, 42 are logically disconnected, fire equipment service personnel can test the programming of the fire alarm panel 26 up to the interface 10, using an automated testing procedure built into the interface.

The interface 10 may also allow elevator service personnel to logically disconnect the elevator controller 16 from the fire alarm panel 26 so that work on the elevator systems can be performed without fear of impacting the fire alarm panel 26.

Since the interface 10 provides for logical disconnection between the fire alarm panel 26 and elevator controller 16, test operations can be performed by service personnel without physically removing or disconnecting any wiring.

The interface 10 may contain indicators confirming status of the interface, including the progress of testing being performed on the fire panel 26. FIG. 2 shows an exemplary arrangement of indicators 46-58, which, as shown, comprise light-emitting diode (LED) indicators, for identifying various status conditions of the interface 10. The indicators 46-58 may correspond to individual relays disposed within the interface. In one embodiment, the indicators 46-58 may provide a visual indication that testing of an associated relay is being performed, or has been completed.

As noted, the indicators 46-58 may relate to individual relays disposed within the interface 10. As shown in FIG. 2, the indicators 46-56 on the fire alarm panel side (i.e., the first portion 40) of the interface 10 include a primary recall indicator 46, an alternate recall indicator 48, a firefighter warning indicator 50, a shutdown indicator 52, a "bypassed" indicator 54, and a "testing in progress" indicator 56. The "bypassed" indictor 54 indicates that the interface 10 has been bypassed on the fire alarm panel side (i.e., fire panel service personnel have initiated the logical disconnection of the systems.) The "testing in progress" indicator 56 indicates that testing of the fire alarm panel is underway.

An indicator 58 can also provided on the elevator controller side (the second portion 42) to indicate that the interface 10 has been bypassed on the elevator controller side (i.e., elevator service personnel have initiated the logical disconnection of the systems). In one embodiment, the primary recall indicator 46, alternate recall indicator 48, firefighter warning indicator 50 and shutdown indictor 52 comprise red LED's, while the bypass indicators 54, 58 comprise yellow LED's. It will be appreciated that the indicators are not so limited, and that any of a variety of colors can be used. Likewise, any of a variety of visual and/or audio indicators can be used in place of LED's.

In one embodiment, regardless of whether a bypass is initiated on the fire alarm panel side or the elevator controller side, both bypass LEDs 54, 58 will illuminate to indicate the existence of a bypass condition.

As previously noted, fire alarm service personnel may initiate the logical disconnection of the fire alarm panel 26 and the elevator controller 16 by first gaining access to the first portion 40 of the interface by using a key in lock operable via keyway 44 disposed in or on the interface 10. In addition, respective activation switches 60, 62 may be provided on the first and second portions 40, 42 of the interface to activate the disconnection. In one embodiment, these activation switches 60, 62 are electrically keyed switches ("keyswitches") that enable service personnel to activate the disclosed bypass condition on either the fire alarm panel side or the elevator controller side, after the associated keyswitch has been actuated. The keyswitches 60, 62 are keyed differently so that a first key is operable to actuate keyswitch 60 (for fire alarm service personnel) and a second, different, key is operable to actuate keyswitch 62 (for elevator service personnel). Thus, the second key will not actuate the first keyswitch 60, and the first key will not actuate the second keyswitch. The lock associated with keyway 44 may be operable using the same key that is operable to actuate keyswitch 60, thus enabling fire alarm service personnel to carry a single key to operate both the lock and the keyswitch 60. In one embodiment, when one of the activation switches 60, 62 is operated, the associated indicators 56 and 58 will light up to indicate that a bypass condition has been instituted.

In one embodiment, the initiation switch 66 (i.e., the switch that actually initiates a fire system test) is not operable unless the associated keyswitch 60 has been actuated. Such an arrangement prevents unauthorized disconnection of the systems.

The first portion 40 may also include a test initiation switch 66 for initiating a test of one or more of the action relays in the interface 10. In one embodiment, the test initiation switch 66 is a push button switch. It will be appreciated that this switch could instead be a toggle switch, or other appropriate actuator.

The interface 10 may include a notification function that indicates to building or other service personnel that testing of the fire alarm panel (or the elevator controller) is being performed. Thus, the interface 10 may provide a signal to the fire alarm panel 26 (often referred to as a "trouble") to notify building personnel that testing of the fire alarm panel 26 is being performed, and that the fire alarm panel 26 is presently disconnected from the elevator controller 16. This trouble condition also may be included in a historical log associated with the fire alarm panel 26 and/or the building control system.

The interface 10 may comprise an enclosure 68 having a multipoint interface board 70 (FIG. 3) that allows the interface 10 to be connected to any of a variety of fire alarm control panels using (RUI) remote unit interface, IDNet, N2, or network communications.

Figure 3:
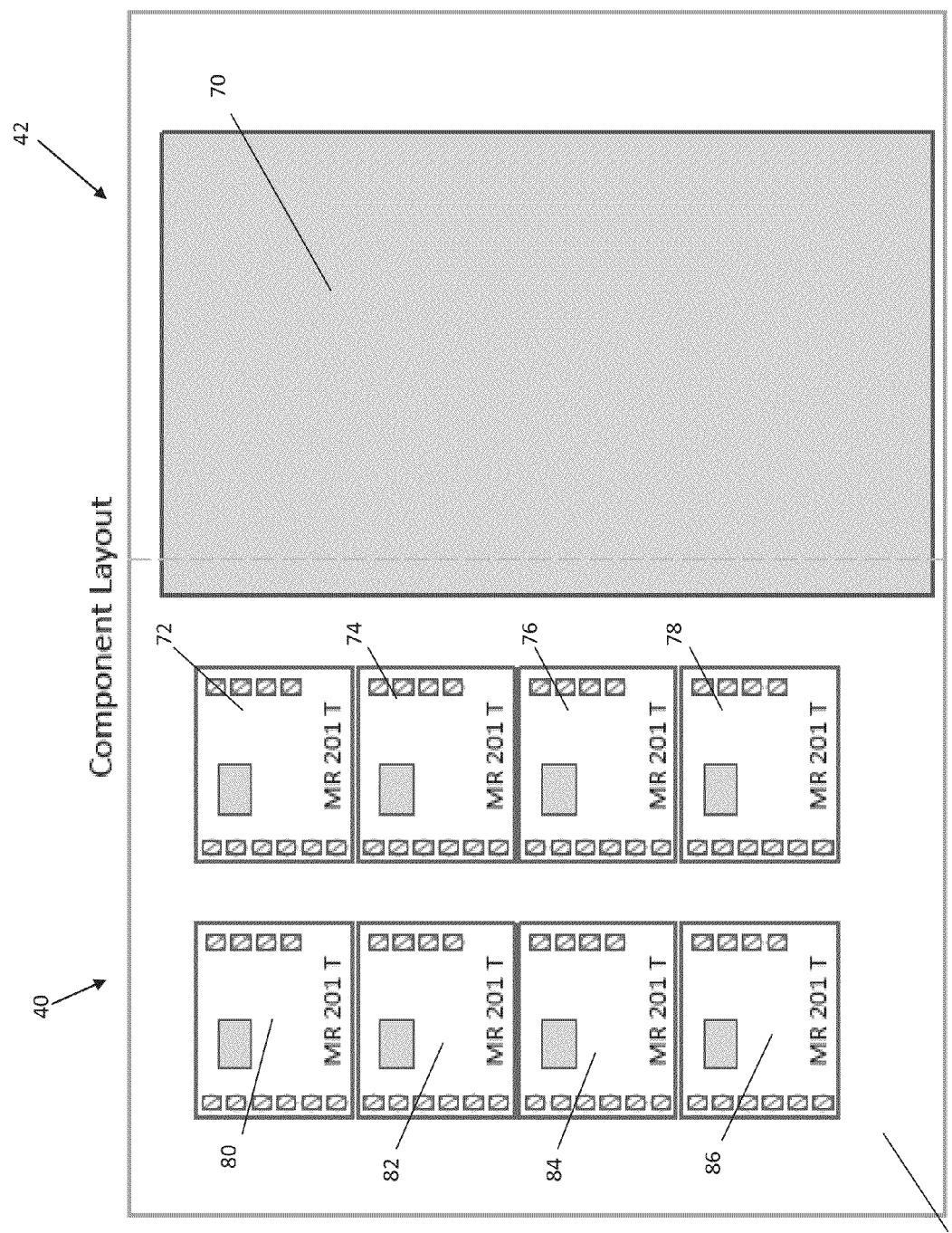
FIG. 3 is an illustration of an interior of the interface of FIG. 2.

FIG. 3 shows the arrangement of individual action relays and bypass relays within the interface 10. Specifically, interface 10 includes eight individual relays 72-86. The first four of these relays 72-78 are referred to as "action" relays, and are associated with elevator control. The second four of these relays 80-86 are referred to as "bypass" relays, and are used to bypass the action relays during testing operations so that signals from the action relays do not cause the elevator controller 16 to act upon the action relay signals. It will be appreciated that although the description will proceed in relation to a relay-based system, that other electronic switches can be used instead of the explicitly recited relays. For example, in some embodiments the relays could be replaced by solid state controls.

In the illustrated embodiment, the action relays include a primary recall relay 72, an alternate recall relay 74, a firefighter warning relay 76 and a shutdown relay 78. The primary recall relay 72, when activated, is operable to instruct the elevator controller 16 to send the elevator car 20 to a primary predetermined floor, which is often the ground floor of the building 2, and to open the doors to release any elevator occupants. The alternate recall relay 74, when activated, is operable to instruct the elevator controller 16 to send the elevator car 20 to a secondary predetermined floor when fire/smoke have been detected on the primary predetermined floor. The firefighter warning relay 76 may be activated when fire is detected in the elevator shaft. This relay may provide a flashing light in the elevator car 20 to warn a firefighter not to use the elevator for firefighting service. The shutdown relay 78 may be activated when fire is detected in the elevator shaft or the elevator machine room. It may instruct the elevator controller 16 to send the elevator care 20 to a predetermined floor and release any occupants, and then shutdown power to the elevator system. It will be appreciated that this arrangement of relays and their respective functionalities are exemplary, and greater or fewer action relays can be used. In addition, action relays may be used that have different functionalities than those described above.

As noted, the bypass relays 80-86 may be used to prevent signals from the action relays from reaching the elevator controller 16. Thus, the bypass relays 80-86 may be electrically coupled between the action relays and the actual wiring that goes to the elevator control. Thus, the action relays 72-78 may have a first connection to the elevator controller 16, and a second connection to an associated bypass relay 80-86. Thus, during normal operation, signals from the action relays 72-78 are sent via the first connection directly to the elevator controller 16. When bypass operations are initiated (the aforementioned logical disconnection), signals from the action relays 72-78 are sent via the second connection to the bypass relays 80-86, thus preventing the signals from reaching the elevator controller 16.

Figure 4:
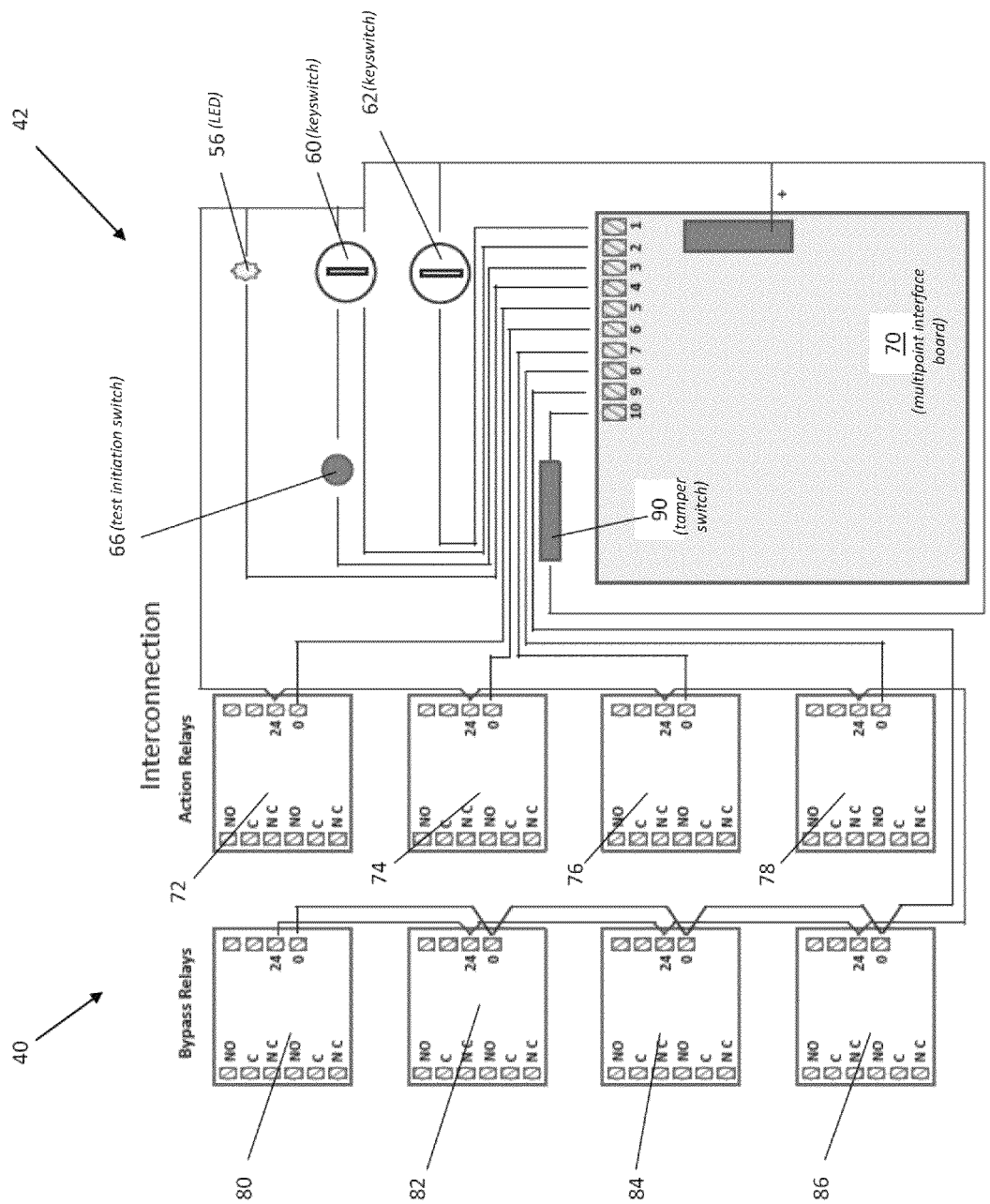
FIG. 4 is a diagram illustrating an interconnection of bypass and action relays of the interface of FIG. 2.

Referring to FIG. 4, a description of the interconnection between relays and the multipoint interface board 70 will be provided. Terminal 1 on the multipoint interface board 70 provides an input from keyswitch 62 for initiating a bypass from the elevator service personnel. Terminal 2 on the multipoint interface board provides an input from keyswitch 60 for initiating a bypass from the fire alarm service personnel. This action will also enable the test switch for initiating a functional test of the interface. Terminal 3 on the multipoint interface board 70 provides an input from test initiation switch (pushbutton) 66 for initiating a functional test from the fire alarm service personnel. Terminal 4 on the multipoint interface board 70 provides an output for LED 56 when a test of the interface has been initiated. Terminal 5 on the multipoint interface board 70 provides an output for activating the primary recall relay during a test or when primary recall has been initiated by the fire alarm panel 26. Terminal 6 on the multipoint interface board 70 provides an output for activating the alternate recall relay during a test or when alternate recall has been initiated by the fire alarm panel 26. Terminal 7 on the multipoint interface board 70 provides an output for activating the firefighter warning relay 76 during a test or when a firefighter warning has been initiated by the fire alarm panel 26. Terminal 8 on the multipoint interface board 70 provides an output for activating the elevator shutdown relay during a test or when elevator shutdown has been initiated by the fire alarm panel 26. Terminal 9 on the multipoint interface board 70 provides an output for activating the bypass relays (4) if a bypass is initiated from keyswitch 62 or keyswitch 60. Terminal 10 on the multipoint interface board 70 provides an input for initiating a signal in the fire alarm panel 26 if the cover of the interface 10 has been removed.

Figure 5:
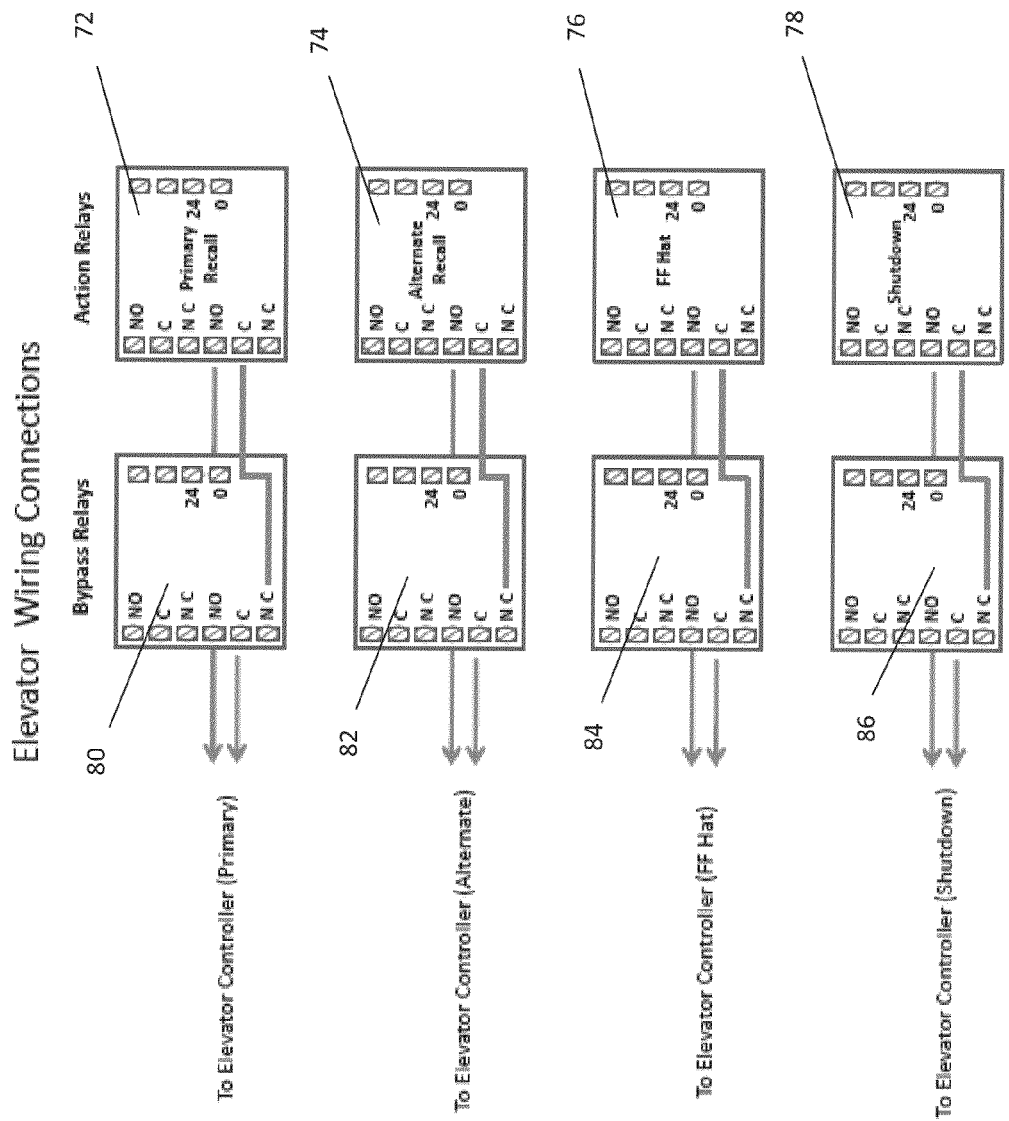
FIG. 5 is a diagram illustrating elevator wiring connections of the bypass and action relays of FIG. 4.

As shown in FIG. 5, each bypass relay 80, 82, 84, 86 has an internal wiring scheme which puts it in series with its associated action relay 72, 74, 76, 78, with respect to the connection to the elevator controller 16. Thus, each action relay 72, 74, 76, 78 is paired with an associated bypass relay 80, 82, 84, 86.

Figure 6:
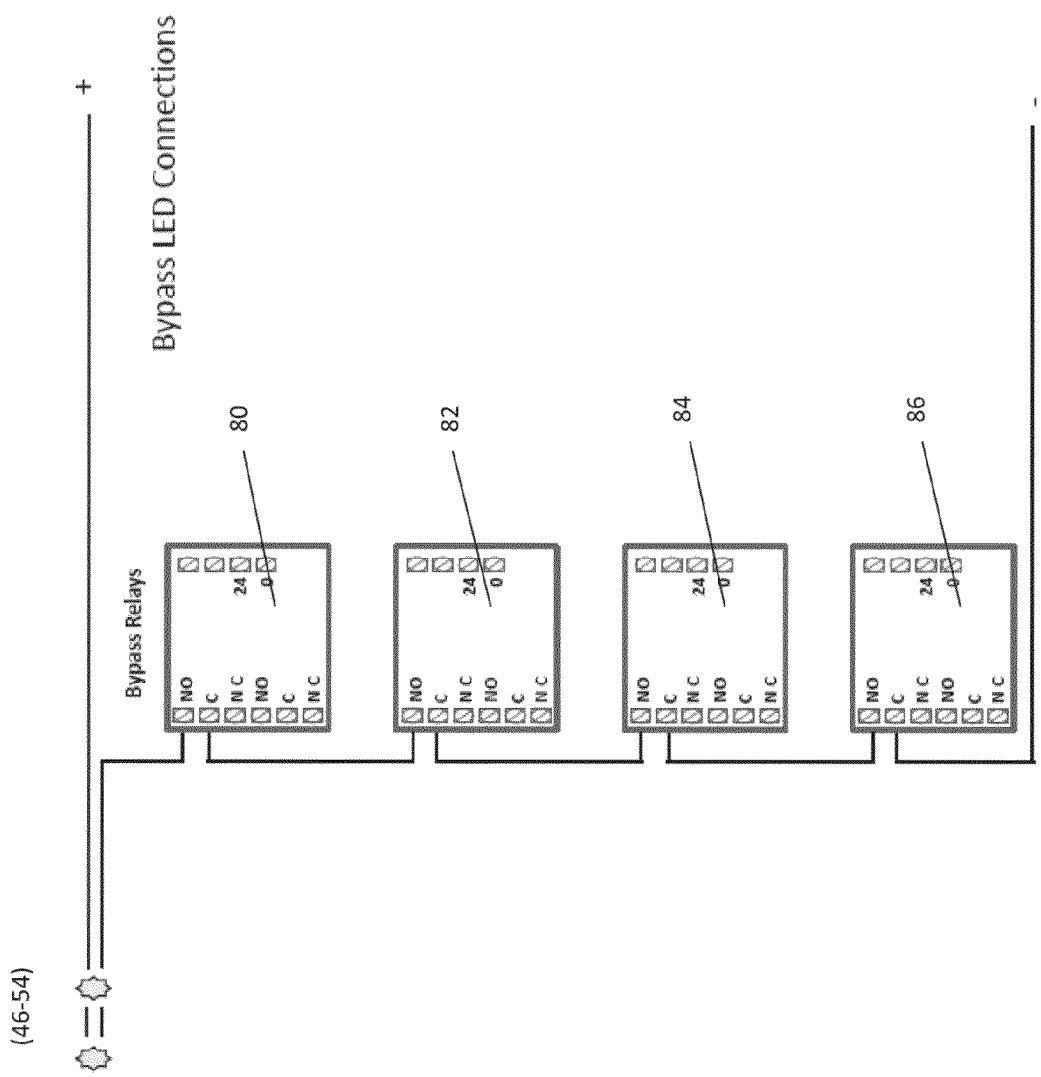
FIG. 6 is a diagram illustrating bypass LED connections of the bypass relays of FIG. 2.

Referring to FIG. 6 a set of NO (normally open) contacts in each of the bypass relays 80, 82, 84, 86, wired in series, will illuminate both bypass LEDs 54, 58 in the event that a bypass is initiated with either keyswitch 60, 62, and all bypass relays 80, 82, 84, 86 are activated.

Figure 7:
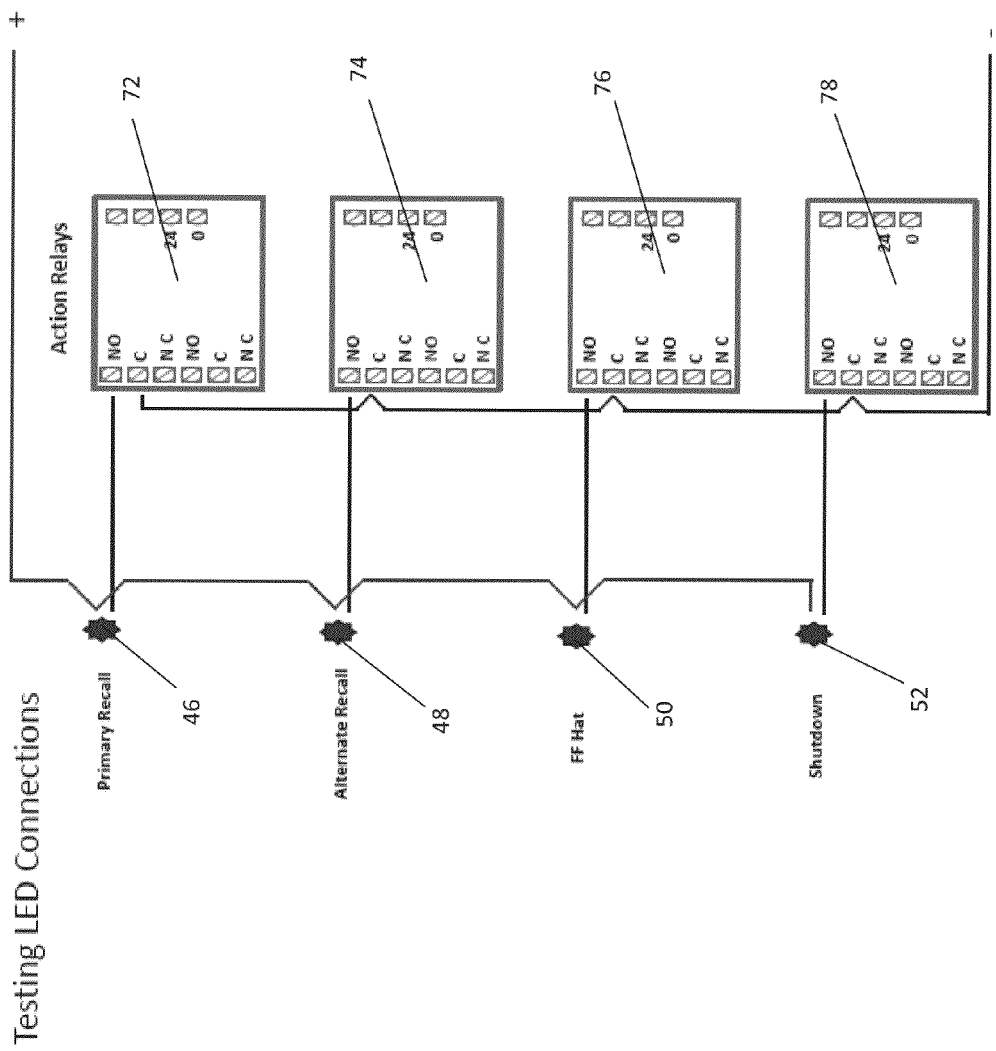
FIG. 7 is a diagram illustrating testing LED connections of the action relays of FIG. 2.

Referring to FIG. 7, each action relay 72, 74, 76, 78 has an associated LED (46-52) for positive visual indication that the associated relay has activated, either during a test or during an actual activation from the fire alarm panel 26.

As arranged, the interface 10 enables fire alarm service personnel to initiate a bypass that allows test programming in the fire alarm panel 26 to function, while activating the bypass relays 80-86, which prevents the activated action relays 72-78 from sending signals to the elevator controller 16. Thus, when fire alarm service personnel initiate a test, programming in the fire alarm panel 26 runs a test at the interface 10, which turns on the action relays in sequence. Associated indicators 46-52 will light, in sequence, as each action relay is activated, but the associated bypass relays prevent the action relays from signaling the elevator controller 16.

The interface 10 includes a door (not shown) that covers the first portion 40 of the interface, while leaving the second portion 42 (associated with the elevator controller 16) accessible for elevator maintenance personnel. Each portion 40, 42 of the interface 10 may include a keyswitch 60, 62 for initiating respective operations.

Fire alarm service personnel and elevator control personnel will be provided with separate keysets, which will be operable to initiate bypass operations of the interface 10 from respective sides 40, 42 of the interface. In this manner, a log can be kept indicating which key set was used to logically disconnect the fire alarm panel 26 from the elevator controller 16). For example, the fire alarm equipment side (first portion 40) may allow for testing of panel equipment to be initiated while the interface 10 is bypassed. Similarly, the elevator side (second portion 42) may enable elevator personnel to disconnect the elevator controller 16 from the interface 10 for servicing or maintenance purposes. In either case, a "trouble" condition can be signaled at the fire alarm panel 26 (and/or other location) when a bypass is initiated on either side of the interface 10. This prevents the interface being left indefinitely in a condition in which the fire alarm panel 26 is logically disconnected from the elevator controller 10 without notification. In addition, since separate inputs are used for the separate "bypass" keys, the fire alarm system can log which side of the interface initiated the bypass.

Fire Panel Interface Side Operation

The fire alarm panel technician would open the door of the interface 10, and activate a key lock via keyhole 44 to gain access to the first portion 40 of the interface. The technician would then activate keyswitch 60 to initiate a bypass condition of the interface. The associated LED 54 and 58 will light to indicate that the interface 10 is in a bypass condition on the fire alarm panel 26 side. The bypass relays 80-86 are triggered within the interface 10. In addition, the test initiation switch ("Test" button) 66 is made active. A test of the interface 10 can then be initiated simply by pressing the "Test" button 66. In one exemplary embodiment, this testing would cycle each of the action relays (primary recall 46, alternate recall 48, firefighter warning 50, and shutdown 52) into an "ON" condition. The individual cycling of these relays may be indicated in real time on the associated LEDs at the interface 10. Lighting of each of the LED's would confirm that the elevator control relays are functional and intact. Upon completion of testing, the keyswitch would be deactivated (via reverse turn of the keyset in the keyhole), and the interface 10 would be returned to a normal operational (i.e., non-bypassed) condition. A signal may be automatically provided to the fire alarm panel 26 (and/or other location) when the interface 10 is returned to this normal operational condition.

Elevator Interface Side Operation

Elevator personnel would utilize a keyswitch 62 at the interface 10 to initiate a bypass condition of the interface. The associated LED 58 and 54 will light to indicate that the interface 10 is in a bypass condition on the elevator controller 16 side. Keyswitch activation automatically triggers operation of the bypass relays 80-86 within the interface 10, thus enabling testing or other operation of the elevator control system without impacting the fire alarm panel 26.

Tamper Operation

A tamper switch 90 (FIG. 4) may be provided to generate an indication at the fire alarm panel 26 in the event that any portion of the interface is removed. Thus, if personnel remove the interface cover to physically disconnect the internal wiring, such a condition will be affirmatively indicated at the fire alarm panel 26 and/or the elevator control station.

Figure 8:
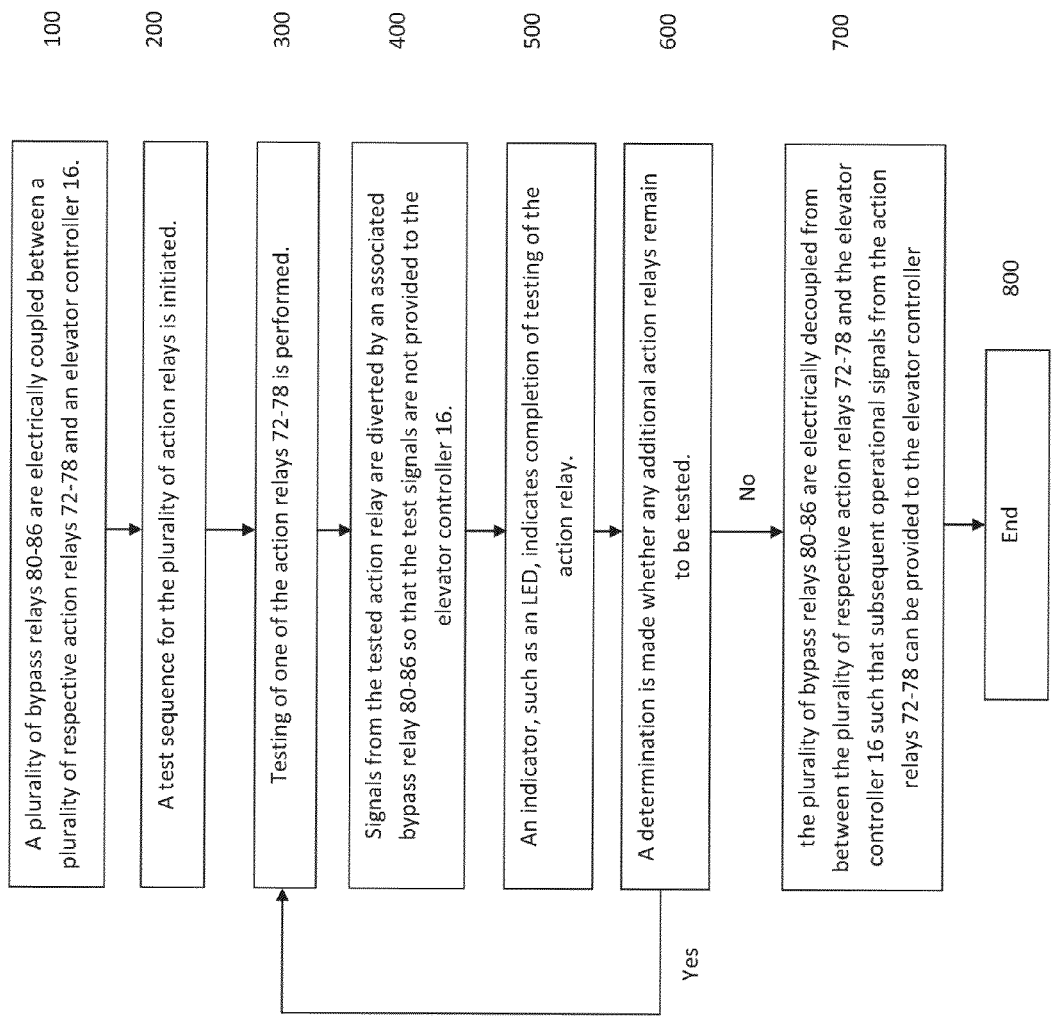
FIG. 8 is a flowchart illustrating an exemplary method in accordance with the disclosure.

Referring now to FIG. 8, an embodiment of the disclosed method will be described in greater detail. At step 100, a plurality of bypass relays 80-86 are electrically coupled between a plurality of respective action relays 72-78 and an elevator controller 16. At step 200, a test sequence for the plurality of action relays is initiated. In one embodiment, the test sequence is initiated via a button press. At step 300, testing of one of the action relays 72-78 is performed. At step 400 signals from the tested action relay are diverted by an associated bypass relay 80-86 so that the test signals are not provided to the elevator controller 16. At step 500, an indicator, such as an LED, indicates completion of testing of the action relay. At step 600, a determination is made whether any additional action relays remain to be tested. If at least one additional action relay remains to be tested, the method returns to step 300, and testing of the at least one additional action relay is performed. Steps 400-600 are repeated until all action relays are tested. At step 700 the plurality of bypass relays 80-86 are electrically decoupled from between the plurality of respective action relays 72-78 and the elevator controller 16 such that subsequent operational signals from the action relays 72-78 can be provided to the elevator controller. At step 800, testing is complete.

Bypass operations may be disabled if an alarm condition already exists or an elevator operation has already occurred. Thus, in one embodiment, the only time bypass can be initiated and testing allowed is when the fire alarm panel 26 and elevator controller 16 are not involved in any alarm related operations.

In some embodiments, statements may be entered into a log associated with the fire alarm panel 26 as bypass operations are performed, and as each action relay is being tested. The log may include information such as time/date of bypass, what entity performed the bypass (i.e., fire panel service personnel, elevator controller personnel), results of relay testing, and the like. From this information, reports can be generated.

It will be appreciated that the bypass configuration described in relation to the interface 10 may be implemented on one or more printed circuit boards (PCBs) to provide a reduced footprint for the interface 10.

The functional programming may consist of default programming in the fire alarm panel 26, in the interface 10, within custom field programming in the fire alarm panel 26, or any combination of the above. This programming would be the instruction set needed for the expected operation of the interface 10. The described testing sequence is an example of part of this programming. The programming could reside in the interface 10, in the default programming in the fire alarm panel 26, or it could be field written in custom control in the fire alarm panel. In one embodiment, the functional programming is included with the interface so field programming is not required.

It will be appreciated that although the interface 10 has been described in relation to four operational relays and four bypass relays, greater or fewer sets of relays could be provided to suit a particular installation. For example, the interface 10 could be made expandable.

The disclosed system and device include a specific interface for enabling logical disconnection of fire alarm panel and elevator controller elements of an elevator control system. As will be appreciated, the disclosed interface 10 can be used in any building that has an elevator and a fire alarm panel, and can be implemented in a wide variety of communications systems and protocols.

The disclosed system and method can further include an interface of modular design, allowing pluggable modules of groups of relays to be added beyond the original four (4) relay groups. In addition, a modular design may include an action relay, a bypass relay, and the associated action LED on the front of the module.

In addition, the interface need not be specifically named, enabling it to be used for a variety of applications. Further, various application schemes could be implemented to allow a technician to add the interface as a device in the system, where the system already has the programming in place to enable the interface to function.

Some embodiments of the disclosed device may be implemented, for example, using a storage medium, a computer-readable medium or an article of manufacture which may store an instruction or a set of instructions that, if executed by a machine, may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. An interface for connecting a fire alarm panel to an elevator controller, comprising:
   an interface coupled to a fire alarm panel and an elevator controller, the interface having an action relay and a bypass relay;
   the action relay configured to transmit a signal to the elevator controller in response to a signal from the fire alarm panel; and
   the bypass relay configured for selective electrical coupling between the action relay and the elevator controller;
   wherein the interface has a normal operating configuration and a bypass configuration, wherein in the normal operating condition the action relay is capable of transmitting a signal to the elevator controller in response to a signal from the fire alarm panel, and wherein in the bypass configuration the bypass relay is electrically coupled between the action relay and the elevator controller such that signals from the action relay are transmitted to the bypass relay and are not transmitted to the elevator controller.

2. The system of claim 1, wherein the interface includes a plurality of action relays and a plurality of respective bypass relays.

3. The system of claim 2, wherein the bypass configuration corresponds to a testing configuration in which each of the plurality of action relays are activated, and wherein signals transmitted by the action relays, when activated, are diverted by the respective bypass relays and are not transmitted to the elevator controller.

4. The system of claim 3, wherein the interface comprises a plurality of indicators, each of the plurality of indicators associated with a respective one of the plurality of action relays, wherein each of the plurality of indicators provides an indication when a signal is transmitted from an associated action relay while the interface is in the bypass configuration.

5. The system of claim 4, wherein the plurality of indicators comprise light emitting diodes.

6. The system of claim 2, wherein the plurality of action relays comprise a primary recall relay, an alternate recall relay, a firefighter warning relay, and a shutdown relay.

7. The system of claim 1, wherein the interface comprises first and second keyswitches, the first keyswitch associated with a fire alarm panel portion of the interface, the second keyswitch associated with an elevator control portion of the interface, wherein the first and second keyswitches are operable to configure the interface between the normal operating configuration and the bypass configuration.

8. The system of claim 7, wherein the interface further comprises first and second bypass activation switches, the first bypass activation switch associated with the fire alarm panel portion, and the second bypass activation switch associated with the elevator control portion, wherein activation of one of the first and second bypass activation switches configures the interface into the bypass configuration.

9. The system of claim 1, the interface further comprising an indicator for identifying to a user that the interface is in the bypass configuration.

10. The system of claim 1, the interface further comprising an indicator for identifying to a user that testing of the action relay is in progress.

11. A method for isolating a fire alarm panel from an elevator control system, comprising:
   at an interface, electrically coupling a plurality of bypass relays between a plurality of action relays and an elevator controller;
   initiating a test sequence for the plurality of action relays is initiated; and
   performing testing of each of the plurality of action relays, the testing comprising activating each of the plurality of action relays;
   wherein signals transmitted by each of the plurality of action relays are diverted to respective ones of the plurality of bypass relays so that the signals are not transmitted to the elevator controller.

12. The method of claim 11, wherein each of the plurality of action relays is activated in sequence.

13. The method of claim 11, further comprising providing a visual indication at the interface for indicating that testing of each of the action relays is complete.

14. The method of claim 13, wherein the visual indication comprises a light emitting diode (LED) associated with each of the plurality action relays.

15. The method of claim 11, wherein the step of electrically coupling a plurality of bypass relays is achieved by activating a keyswitch at the interface.

16. The method of claim 15, wherein first and second keyswitches are provided at the interface, the first keyswitch associated with a fire alarm panel portion of the interface, a the second keyswitch associated with an interface portion of the interface, wherein each of the first and second keyswitches are operable to electrically couple the plurality of bypass relays between the plurality of action relays and the elevator controller.

17. A system for connecting a fire alarm panel to an elevator controller, comprising:
- means for electrically coupling a plurality of bypass relays between a plurality of action relays and an elevator controller;
- means for initiating a test sequence for the plurality of action relays is initiated; and
- means for performing testing of each of the plurality of action relays, the testing comprising activating each of the plurality of action relays;
- wherein signals transmitted by each of the plurality of action relays are diverted to respective ones of the plurality of bypass relays so that the signals are not transmitted to the elevator controller.

18. The system of claim 17, wherein each of the plurality of action relays is activated in sequence.

19. The system of claim 17, further comprising means for providing a visual indication at the interface for indicating that testing of each of the action relays is complete.

20. The system of claim 17, wherein the means for providing a visual indication comprises a light emitting diode (LED) associated with each of the plurality action relays.

21. An interface for connecting a fire alarm panel to an elevator controller, comprising:
- an interface coupled to a fire alarm panel and an elevator controller, the interface having a bypass switch;
- the bypass switch configured for selectively electrically decoupling the fire alarm panel and the elevator controller;
- wherein the interface has a normal operating configuration and a bypass configuration, wherein in the normal operating condition the elevator controller is coupled to the fire alarm panel, and wherein in the bypass configuration the fire alarm panel is electrically decoupled from elevator controller.

* * * * *